United States Patent [19]
Le et al.

[11] Patent Number: 6,013,391
[45] Date of Patent: Jan. 11, 2000

[54] HIGH CAPACITY HIGH RATE MATERIALS

[75] Inventors: Dinh Ba Le, Minneapolis; William H. Smyrl, New Brighton, both of Minn.; Boone B. Owens, Wrightsville Beach, N.C.; Stefano Passerini, Minneapolis, Minn.

[73] Assignee: Regents of The University of Minnesota, Minneapolis, Minn.

[21] Appl. No.: 08/873,757

[22] Filed: Jun. 12, 1997

Related U.S. Application Data

[62] Division of application No. 08/460,492, Jun. 2, 1995, Pat. No. 5,674,642.

[51] Int. Cl.[7] .................................................. H01M 4/48
[52] U.S. Cl. ..................................... 429/231.2; 429/231.5; 423/592; 423/641
[58] Field of Search ................................. 429/218, 231.2, 429/231.5; 423/592, 594, 641, 646

[56] References Cited

U.S. PATENT DOCUMENTS

| | | |
|---|---|---|
| 4,957,725 | 9/1990 | Potember et al. ....................... 423/592 |
| 5,100,764 | 3/1992 | Paulson et al. . |
| 5,116,703 | 5/1992 | Badesha et al. . |
| 5,135,732 | 8/1992 | Barboux et al. . |
| 5,211,933 | 5/1993 | Barboux et al. . |
| 5,225,297 | 7/1993 | Garcia-Alvarado et al. . |
| 5,271,797 | 12/1993 | Kamisawa . |
| 5,616,309 | 4/1997 | Zachau-Christiansen et al. . 423/594 X |
| 5,683,672 | 11/1997 | Sekai ................... 423/594 X |

OTHER PUBLICATIONS

Columetric titration by the galvanostatic intermittent titration technique (GITT) as described by W. Weppner and R.A. Huggins in Determination of the Kinetic Parameters of Mixed–Conducting Electrodes and Application to the System $Li_3Sb$, *J. Electrochem. Soc.*, 124, 1569 (1977). (Month Unknown).

Derwent Patent Search Dated Feb. 24, 1995.

Aerogels and Xerogels of $V_2O_5$ as Intercalation Hosts, by D.B. Le, S. Passerini, A.L. Tipton, B.B. Owens, and W.H. Smyrl, *J. Electrochem Soc.*, vol. 142, No. 6, Jun. 1995 © The Electrochemical Society, Inc.

High Surface Area $V_2O_5$ Aerogel Intercalation Electrodes, by D.B. Le, S. Passerini, X. Chu, D. Chang, B.B. Owens, and W.H. Smyrl, Department of Chemical Engineering and Materials Science, Corrosion Research Center, University of Minnesota, Minneapolis, MN 55455. 1995 (Month Unknown).

$V_2O_5$ Xerogel Films as Intercalation Hosts for Lithium I. Insertion Stoichiometry, Site Concentration, and Specific Energy, by H.–K, Park, W.H. Smyrl, and M.D. Ward, *J. Electrochem. Soc.*, vol. 142, No. 4, Apr. 1995 © The Electrochemical Society, Inc.

$V_2O_5$ Xerogel Films as Intercalation Hosts for Lithium, by H.–K. Park and W.H. Smyrl, *J. Electrochem. Soc.*, vol. 141, No. 3, Mar. 1994 © The Electrochemical Society Inc.

Spin–Coated $V_2O_5$ Xerogel Thin Films. 1. Microstructure and Morphology, by Stefano Passerini, David Chang, Xi Chu, Dinh Ba Le, and William Smyrl, *Chemistry of Materials*, 1995, vol. 7, No. 4. (Month Unknown).

Electrical Properties of $\beta$–$Li_xV_2O_5$ Thin Layers Prepared by the Sol–Gel Process, by Seung–Young Bae and Masaru Miyayama, and Hiroaki Yanagida, *Journal of the American Ceramic Society*, vol. 77, No. 4, 891–96 (1994). (Month Unknown).

Vanadium Pentoxide Gels, by J. Livage, *Chem. Mater.*, vol. 3, No. 4, 1991, 578–593. (Month Unknown).

Poster material by Dinh Ba Le presented at CRC Open House, Sep. 1994.

Lithium Ion Insertion Metal Oxide Cathode Materials adn High Surface Area Morphology Xerogel, Aerogel and Sol Gel Processing Literature Survey, Including Oxide/Gel Literature Survey, MN, Co and Ni Oxide Cathode Materials Literature Search 950330 and MN, Co and Ni Oxide Cathode Materials Patent Literature Search No. 950331, By Boone B. Owens, dated Apr. 1, 1995.

*Primary Examiner*—Stephen Kalafut
*Attorney, Agent, or Firm*—Vidas, Arrett & Steinkraus, P.A.

[57] ABSTRACT

Nominal composition $V_2O_{4.5}(OH)$ materials suitable for intercalations of greater than 2.4 Li per $V_2O_5$ to yield theoretical energy density of greater than 970 Wh/Kg of cathode active material, the intercalation being completely reversible and synthesis of the materials from sol and gels, and devices incorporating these materials.

23 Claims, 5 Drawing Sheets

HIGH CAPACITY HIGH RATE MATERIALS

CROSS REFERENCE TO RELATED APPLICATIONS

This application is a Divisional of U.S. patent application Ser. No. 08/460,492 filed Jun. 2, 1995 now U.S. Pat. No. 5,674,642. +gi

STATEMENT OF GOVERNMENTAL INTEREST

The invention herein described was made under contract grant No. N/N00014-92-J-L875 provided by the Advanced Research Projects Agency/University Research Initiative.

BACKGROUND OF THE INVENTION

Lithium is intercalated into many host materials. One of these intercalation materials is vanadium pentoxide ($V_2O_5$).

Sol-gel processing has become a common method to prepare macromolecular inorganic network materials via hydrolysis and condensation reactions that start from molecular precursors such as organometallic compounds or inorganic salts. Vanadium pentoxide gels have received significant attention because they serve as host materials for a wide variety of metal cations and as conductive, anti-static coatings in the photographic and information storage industries. Crystalline $V_2O_5$ (c-$V_2O_5$) has a low capacity for reversible insertion of lithium (Li), about 1 Li ion per mole of the host, and irreversible phase changes are induced by intercalation (lithium insertion) outside this limited composition window. $V_2O_5$ xerogels have been heretofore synthesized by sol-gel routes that have been shown to have a larger capacity for Li insertion (2 ions but appreciably less than 3 ions of Li per mole of $V_2O_5$, i.e., 2.4). Complete reversibility of these insertions has not been possible.

SUMMARY OF THE INVENTION $V_2O_5$ xerogels (XRG) and, cryogels (CRG) have been synthesized by a sol-gel route that uses an ion exchange method to prepare both bulk and film nominal experimental compositions of $V_2O_{4.5}$(OH) that have been shown to have a higher capacity for Li ion insertion than has heretofore been possible (up to 4 ions of Li per mole of $V_2O_5$). Also, these insertions are completely reversible.

Thus, not only is a form of $V_2O_{4.5}$(OH) provided by novel synthesis having larger and reversible capacity for Li insertion, but also new compositions upon insertion are now possible:

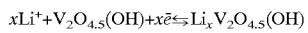
$$xLi^+ + V_2O_{4.5}(OH) + x\bar{e} \rightleftharpoons Li_xV_2O_{4.5}(OH)$$

where $x \geq 2.4$ but $\leq 4$.

The sol-gel route has also been used to prepare highly microporous $V_2O_5$ aerogels (ARG) by supercritical drying. These materials also are a form of $V_2O_{4.5}$(OH) but contain a small amount of chemically bound carbon material left over from the drying procedure, about 4 wt. % up to about 7 wt. %.

The form is more specifically described herein as $V_2O_{4.5}$(OH) (bound carbon) and has been found not only to possess the reversible capacity for Li insertion (up to 4 Li) as described above for XRG and CRG forms but to also provide an unexpectedly higher electrochemical potential as compared to the XRG and CRG forms of this invention. Thus, there is provided a new composition $V_2O_{4.5}$(OH) (bound carbon) sometimes referred to as (solvent) prior to Li insertion as well as novel synthesis therefor.

Equipment for accomplishing supercritical drying is readily available. For example, Model SAMDRI-780A Critical Point Drying Apparatus for use with liquid carbon dioxide, Freon 13 or nitrous oxide is available from TOUSIMIS RESEARCH CORP., 2211 Lewis Ave., Rockville, Md. 20851.

Figure 1:
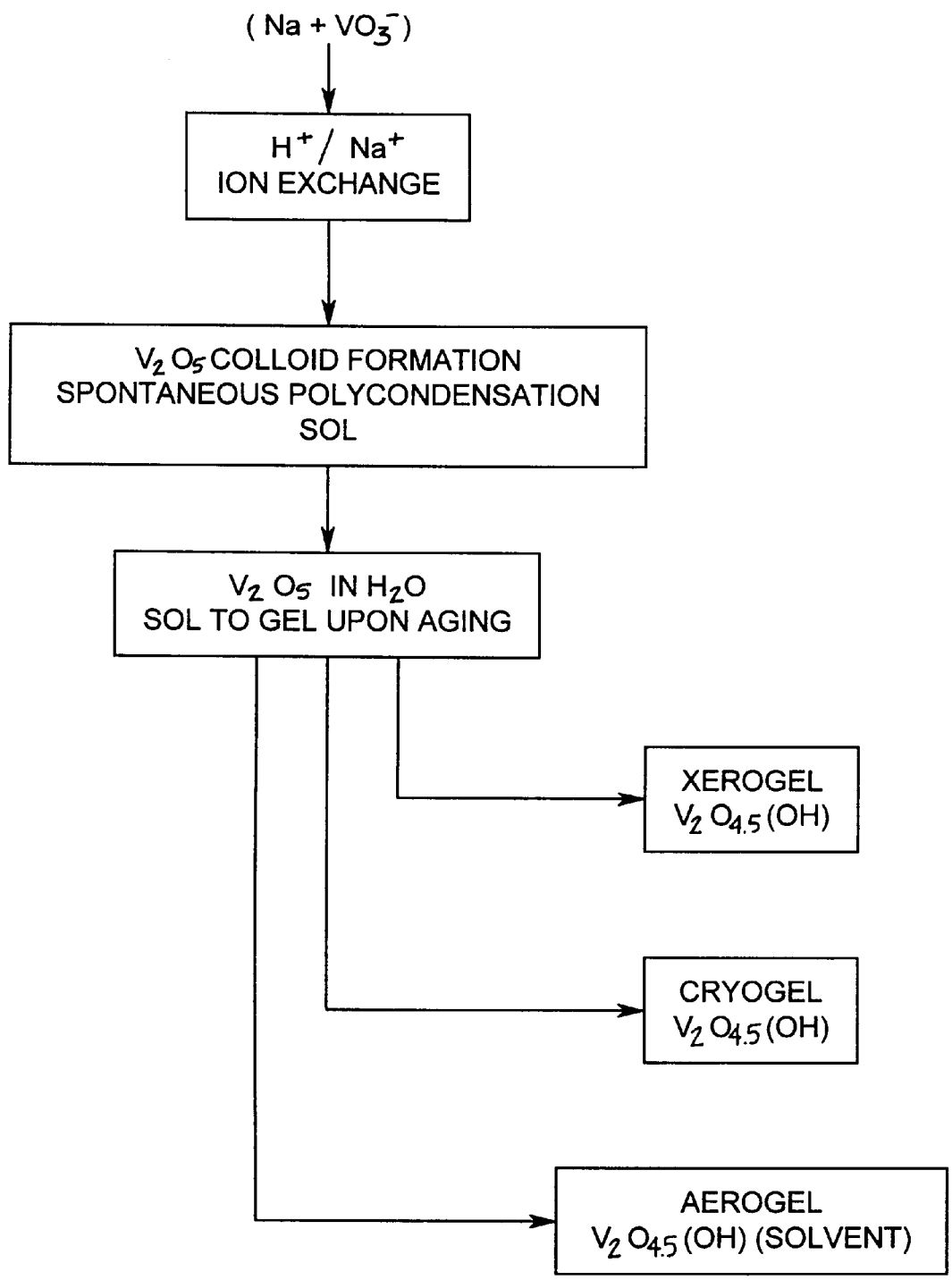
FIG. 1 is a schematic flow diagram showing the synthesis procedures in general for preparing and processing the materials of the invention.

DETAILED DESCRIPTION OF THE INVENTION $V_2O_5 \cdot 0.5H_2O$ xerogels (XRG), cryogels (CRG) and aerogels (ARG) provide excellent intercalation host materials for lithium ions ($Li^+$) when synthesized according to this invention. The increased intercalation capacity makes these materials useful for battery electrodes, electrochromic displays and other electrochemical devices. The materials described hereinbelow show the highest capacity and highest energy density of any vanadium oxide. They are also more energetic than heretofore reported values for lithiated oxides of manganese, cobalt and nickel. The materials described herein exhibit the highest columbic capacity of any of the intercalation hosts yet discovered.

In all test cells described below, assembly and final sealing of the cells were conducted in helium filled dry boxes (glove boxes) or a <1% relative humidity dry room.

Precursor Hydrogel $V_2O_5 \cdot nH_2O$

The initial step in practicing the invention involves preparing a precursor hydrogel of the $V_2O_5$. This may be effected in a variety of ways known in the art but a preferred procedure is to synthesize the hydrogel from a solution of metavanadate salt such as for example the sodium form which is passed through an ion exchange column in which the sodium ions are exchanged with hydrogen ions to produce decavanadic acid which is collected in fractions. The middle fractions (~50%) are allowed to set without disturbance. Self-assembly of $V_2O_5$ fibrils and ribbons occurs and in a first stage a colloidal "sol" is formed. Further maturation produces a uniform viscous "gel" in a second stage. The gel network consists of interconnected solid and water phases. The concentration and temperature influence the rate of maturation to the gel state and also its viscosity. The time can change from a few minutes at high concentrations to weeks or months at low concentrations. A preferred concentration range of the metavanadate salt is 0.1 moles/liter to 0.5 moles/liter. The time for aging to maturation in this case ranges from one week to two months. Increased concentration of decavanadic acid precursor, increased time, increased temperature and increased (but relatively low) concentrations of V(IV), all increase the rate of self-assembly of the ribbons.

Other sol-gel processes may be used. For example $V_2O_5$ may be melted and quenched in water. Whatever approach is used, they will all have in common the hydrolysis and condensation reactions which progressively form the first stage sol and the second stage gel, resulting in $V_2O_5 \cdot nH_2O$.

Having obtained the gel network (precursor hydrogel $V_2O_5 \cdot nH_2O$) it may then be used with further processing as a source of the materials of the invention. Generally, the further processing involves the removal of additional water while preserving the network, resulting in microporous solid material $V_2O_{4.5}(OH)$ with high surface area, a red color of the material is preferred.

The pores which are filled with water in the gel have different sizes for different hydration states of the gel. Thus, by changing the concentration of the liquid gel, one can deliberately manipulate the pore size to obtain product materials of predetermined surface area, catalytic activity and kinetic capability. For example, 0.5M sodium metavanadate gives $V_2O_5 \cdot 200H_2O$ gel and 0.1M gives $V_2O_5 \cdot 1000H_2O$.

Several different types of preferred alternative synthesis processing will now be described for obtaining the intercalation materials of the invention. These are presented in brief in the drawing of FIG. 1.

Nominal Experimental Composition XEROGEL $V_2O_{4.5}$(OH)

As can be seen in FIG. 1, the first alternative is xerogel material which can in turn be prepared by several different processes, depending on whether one wishes to prepare bulk material or film material.

The bulk material (a red powder) is prepared by a quick vacuum process preferably at room temperature which results in $V_2O_{4.5}(OH)$ having a surface area of approximately 10 m $^2$/g.

EXAMPLE 1

The liquid gel was placed in a shallow plastic container with open top. The liquid gel was spread out to a layer of one centimeter thick, then placed in a glass container sealed, and a vacuum was quickly drawn by a vacuum pump with a dry-ice/alcohol mixture coldtrap. The drying time was typically one day. The so dried sample was then ground to powder and vacuum dried again. The dried powder was ball milled with acetylene black carbon (73.9% wt. of the xerogel powder and 26.2% wt. of acetylene black) for one day. The composite powder was then ground with PTFE powder and 10% PTFE and pressed into pellets (0.5 mm thick and 1.3 cm in diameter). The final composition of the pellets was 67% xerogel powder: 23% acetylene black: 10% PTFE. These pellets were then assembled in coin cells as cathodes for Li insertion and release tests.

A thin film material may be prepared by spin coating the precursor hydrogel. This is described in Example 2.

EXAMPLE 2

Figure 2:
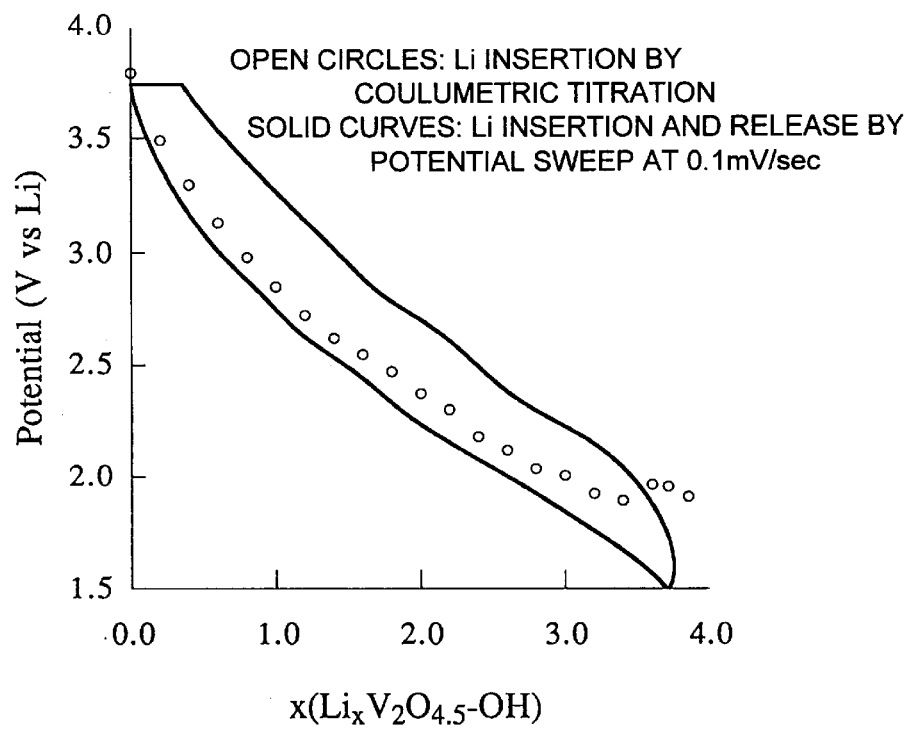
FIG. 2 is a graph showing reversible capacity of spin coated $V_2O_{4.5}$(OH) XRG thin film (Example 2).

Precursor hydrogel was spin coated onto metal (Ni or Au) coated quartz and silicon substrates. About 0.2 cubic centimeter of hydrogel per square centimeter of substrate was placed on the spin coater at 2000 rpm and after 60 seconds a thin coat of XRG was formed. This was further dried by slow evacuation at 25° C. for 16 hours to the nominal experimental stoichiometry $V_2O_{4.5}(OH)$ and nominal surface area of 10 m $^2$/g. A 30 $\mu$g/cm$^2$ film 0.1 $\mu$m thick was formed on the substrate piece of it was then used as an electrode for test purposes. The electrode was placed in a solution of 1M Li $ClO_4$ in propylene carbonate and cycled against lithium. The test cell was assembled in a dry box. The resulting FIG. 2 shows that 4 Li$^+$ ions are inserted reversibly as the electrode cycles between 3.5 and 1.5V. This corresponds to a specific capacity greater than 2000 coulombs/gram and a specific energy of greater than 1000 Wh/Kg for the balanced electrodes.

A film coating may also be prepared by dip coating a substrate into the precursor hydrogel or by doctor blading a layer onto the substrate or by spray coating. Dip coating is described in Example 3.

EXAMPLE 3

The liquid gel was pasted onto the C-BORE of a stainless steel disk (2.54 cm in diameter). The C-BORE was at the center of the Disk with 1 cm in diameter and with the depth varying from 0.1 mm to 1 mm. The gel was dried in air for one hour and then vacuum dried for at least 16 hours before use as cathode for Li insertion and release tests. "C-BORE" is a term used in machine shops to describe a piece after a circular region is bored out of a bulk metal substrate.

Dip coating (low shear) causes larger regions of self-alignment and stacking in dried films while spin coating (high shear) causes greater randomization of the ribbons. The latter is more preferred.

Nominal Experimental Formula CRYOGEL $V_2O_{4.5}$(OH)

EXAMPLE 4

Precursor hydrogel was coated onto stainless steel substrates and also onto gold coated silicon and gold coated quartz substrates. The hydrogel was freeze dried to a 10 to 100 micron thick film. As electrodes, the substrates were placed in a solution of 1M Li $ClO_4$ in propylene carbonate and cycled versus Li. At least 3 moles Li per mole $V_2O_5$ mole may be readily inserted.

EXAMPLE 5

Precursor hydrogel may be converted to an organogel by replacing the water with an organic solvent such as acetone, acetonitrile, or 1,4-dioxane, acetone being preferred. Many other solvents are possible by trial and error or through scientific selection of similar organic solvents, including desired subgroups. That solvent is then replaced with liquid $CO_2$ in a supercritical drying chamber maintained at 800 psi and 10° C. The pressure and temperature are increased beyond the critical point for $CO_2$ to provide it in its gaseous form and it is then removed while maintaining the conditions above the critical temperature. High surface area materials with 300–450 m$^2$/g are typically obtained.

An aerogel powder is obtained by supercritically drying the bulk hydrogel. The nominal compositions of this form of the invention is presented $V_2O4.5(OH)$ (bound carbon) where the chemically bound carbon is left over from the drying procedure. It is believed to be a remnant of the solvent used. The compositions contain about 4.5 wt. % water and 4.0–7 wt. % bound carbon.

Thin film aerogel is obtained by supercritically drying a dip coated layer of the liquid gel on a stainless steel substrate. Thick film aerogel electrodes are obtained by supercritically drying the liquid gel in a supporting structure of stainless steel metal screen or of graphite felt (3 mm thick by 1 cm diameter, 80% porosity). Many other materials and structures can be used including most of the types of current collectors used in lithium (ion) batteries.

EXAMPLE 6

Figure 3:
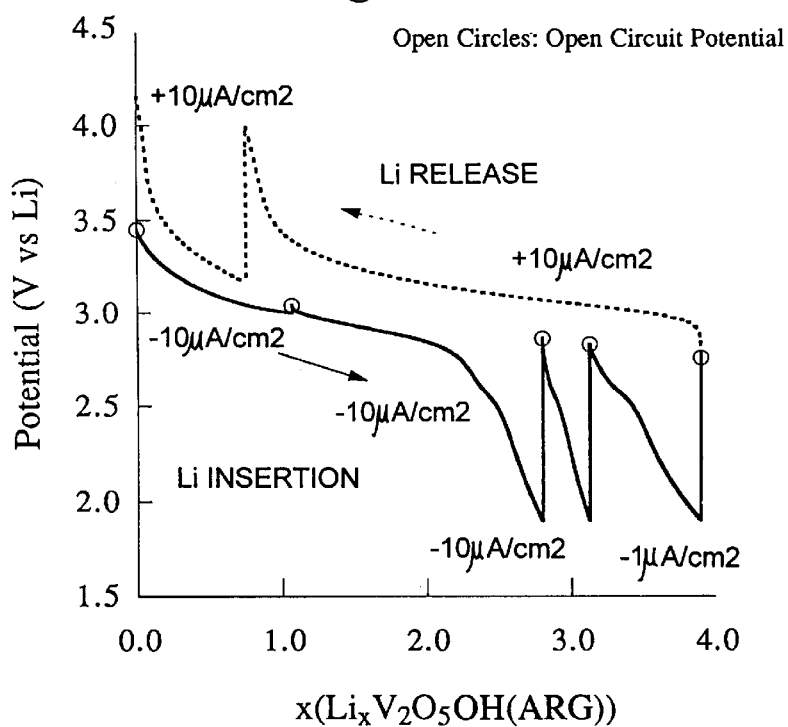
FIG. 3 is a graph showing reversible capacity of $V_2O_{4.5}$(OH) ARG thin film composition: $V_2O_{4.5}$(OH) (bound carbon) 4–7 wt. % (Example 6).

Various forms of aerogel electrodes were placed in a solution of 1M Li ClO$_4$ in propylene carbonate and cycled versus Li. Up to 4 mole of Li per mole of V$_2$O$_5$ were reversibly inserted into the electrodes between 4.1 and 1.5V as can be seen in the graph of FIG. 3.

Composites

Precursor hydrogel may be mixed with carbon particles and sonicated to yield a composite hydrogel. The product may be quick vacuum processed, spin coated, dip coated, etc., (XRG), spray dried, freeze dried as a composite (CRG) or converted to an aerogel (ARG) composite powder. Final drying of such composites is preferably under vacuum.

Compositions include carbon fibers, carbon paper, metal fibers, metal particles, sintered metal fiber sheets, etc., all of which are familiar to those of ordinary skill in the art.

EXAMPLE 7

Figure 4:
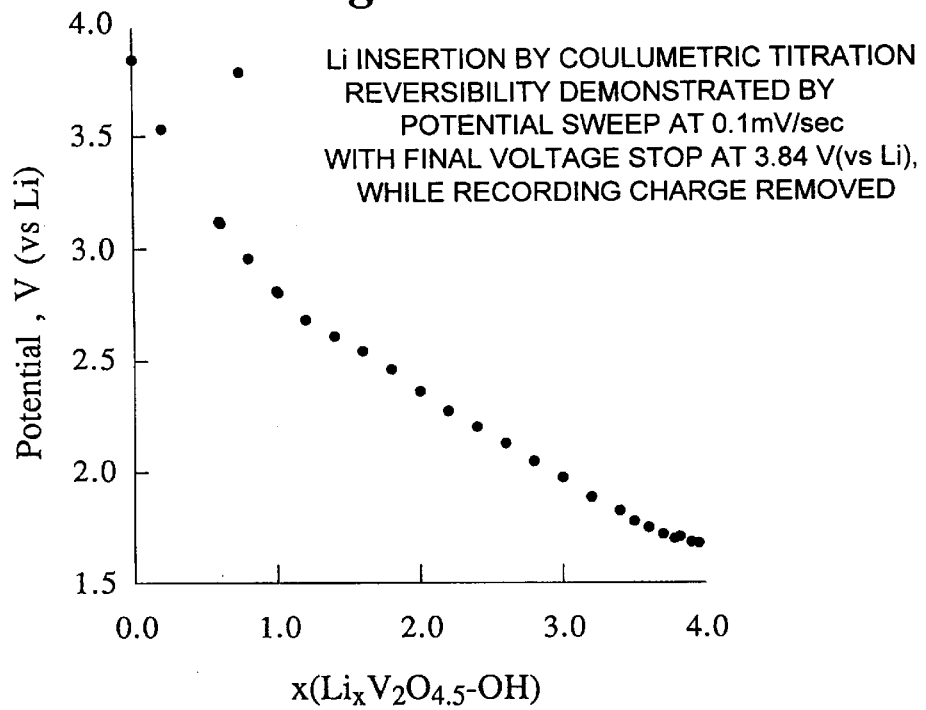
FIG. 4 is a graph showing reversible capacity of carbon composite $V_2O_{4.5}$(OH) XRG thin film (composition by weight: 80% $V_2O_{4.5}$(OH) XRG: 20% Shawinigan an acetylene black (Example 7).

A xerogel-carbon composite dip coated film was so formed and placed in a solution of 1M Li ClO$_4$ in propylene carbonate and cycled versus Li. Up to 4 moles of Li per mole of V$_2$O$_5$ were reversibly inserted into the electrode between 3.8 and 1.5 V as is seen in the graph of FIG. 4. The insertion rate was orders of magnitude higher than the equivalent carbon-free film, with higher specific energy.

EXAMPLE 8

One embodiment uses the precursor hydrogel, adds electronically conductive high surface area powder such as Shawinigan an acetylene black and a binder such as PTFE. This composite gel is then sheared by sonication and then coated onto an electrode foil substrate by dip coating, doctor blading or spray coating, treated as per the XRG, CRG or ARG described above to yield a single or double side coated electrode and then calendared. Such a foil may be continuously produced and readily assembled into standard prismatic or spiral wrapped batteries.

Bipolar electrodes may also be readily constructed for use in high voltage, series connected battery structures.

EXAMPLE 9

Alternatively, the composite gel may be formed as in Example 8 without binder. This may then be converted into the XRG, CRG or ARG powder form according to the invention. The powder may then be formed into an electrode coating or pressed body with addition of appropriate binders such as PVDF or PTFE by use of appropriate solvent for layer adhesion to a substrate.

Figure 5:
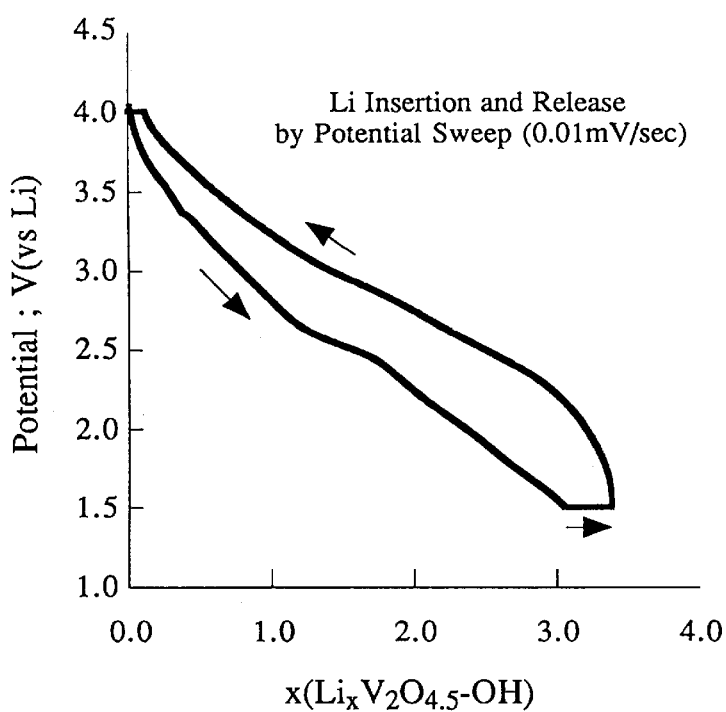
FIG. 5 is a graph showing reversible capacity of carbon composite $V_2O_{4.5}$(OH) pellet (composition by weight: 67% $V_2O_{4.5}$(OH)—vacuum dried XRG powder, 23% showing an acetylene black, 10% PTFE (Example 9).

The resultant article may be calendared and used as described in Example 8. Such an electrode is demonstrated to be reversible in FIG. 5.

EXAMPLE 10

High porosity bronzes may be made according to the invention also. For example, chemical insertion of Li$^+$ may be carried out by reacting solutions of metal halides with V$_2$O$_{4.5}$(OH) XRG, CRG or ARG. A preferred halide is an iodide and a preferred solvent is acetonitrile or a similar nonaqueous liquid. V$_2$O$_{4.5}$(OH) oxidizes the iodide to iodine and the Li$^+$ intercalates into the V$_2$O$_{4.5}$(OH).

The resulting bronze may be used 1) as produced, to serve as a host material for Li$^+$ insertion; 2) heat treated to a material used as host for Li$^+$ or 3) further processed by grinding or spraying to form host material.

Another approach is to react V$_2$O$_5$ precursor hydrogel with a thin film of metal, such as silver or nickel and treated to form the M$_x$V$_2$O$_{4.5}$(OH) of the invention (where M=Ag, Ni, etc.).

EXAMPLE 11

Figure 6:
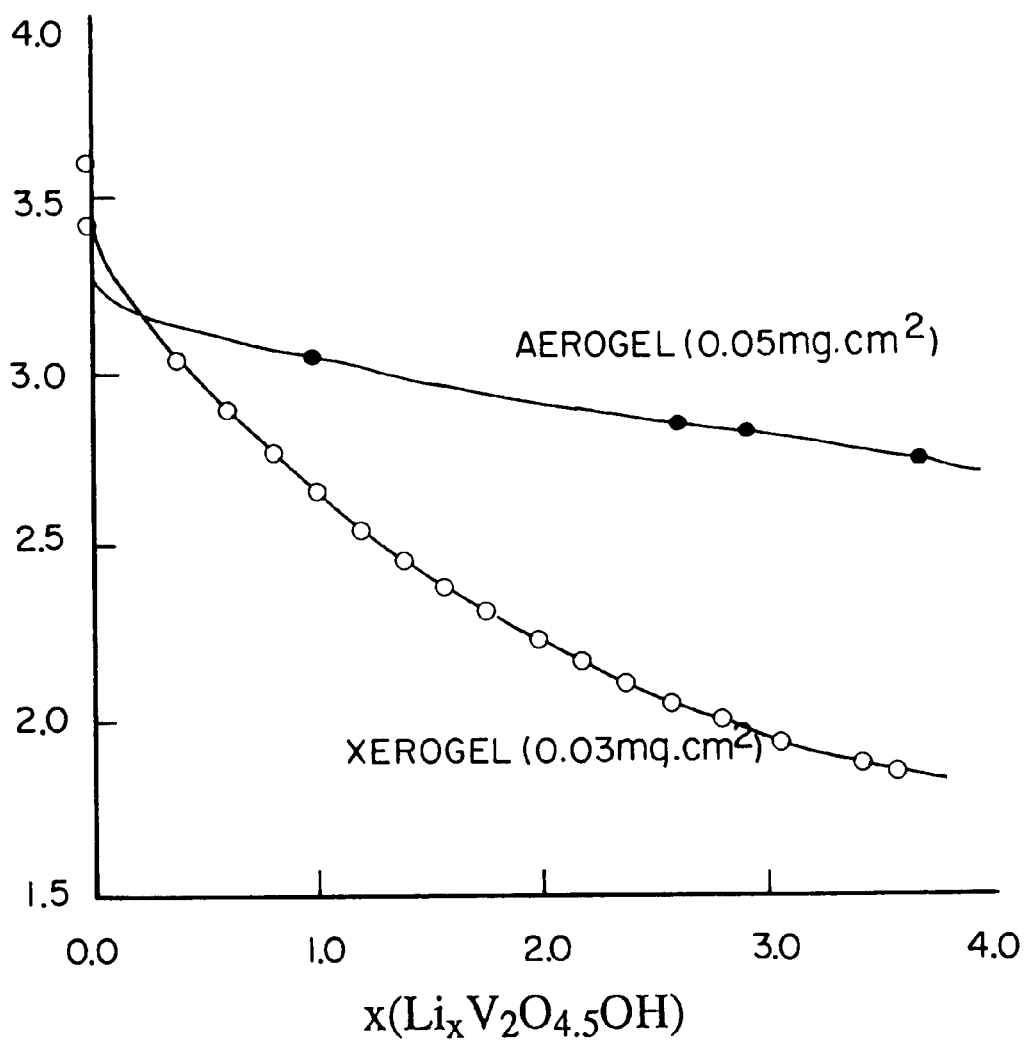
FIG. 6 is a graph of equilibrium potential as a function of Lithium composition for $V_2O_5$ aerogel and xerogel.

The electrochemical performance of ARG film and XRG film samples on stainless steel substrates was studied in three electrode cells using metallic lithium as both the reference and counter electrodes. A 1 M solution of Li ClO$_4$ in anhydrous propylene carbonate was used as electrolyte. Coulometric titration by the galvanostatic intermittent titration technique (GITT) as described by W. Weppner and R. A. Huggins., *J. Electrochem. Soc.*, 124, 1569 (1977), was used to characterize the equilibrium potential as a function of the extent of lithium insertion. FIG. 6 shows the equilibrium potential versus the number of lithium ions inserted for both materials, yielding the highest specific capacities of any known vanadium oxide. In addition, the insertion is completely reversible and all the inserted lithium may be removed from the hosts.

There are also two other remarkable features in the equilibrium potential-composition curves of FIG. 6. First, both curves are smooth, with no steps or inflections that would indicate phase transitions. It is apparent that lithium is inserted into sites that are thermodynamically indistinguishable over the entire range of composition.

The second feature of note in FIG. 6 is the difference between the XRG and ARG hosts. The processing of the precursor gels to the ARG causes the intercalation sites to be altered significantly in energy. This effect is not due to the increased surface area, but is attributed to a chemical modification of the host, yielding a different composition of matter. More specifically, analysis of the ARG has shown the composition to comprise about 4.5 wt. % water, about 4 wt. % of bound carbon from the drying process and the balance as V$_2$O$_5$. The bound carbon is believed to be derived from the organic solvent used to replace the water.

Figure 7:
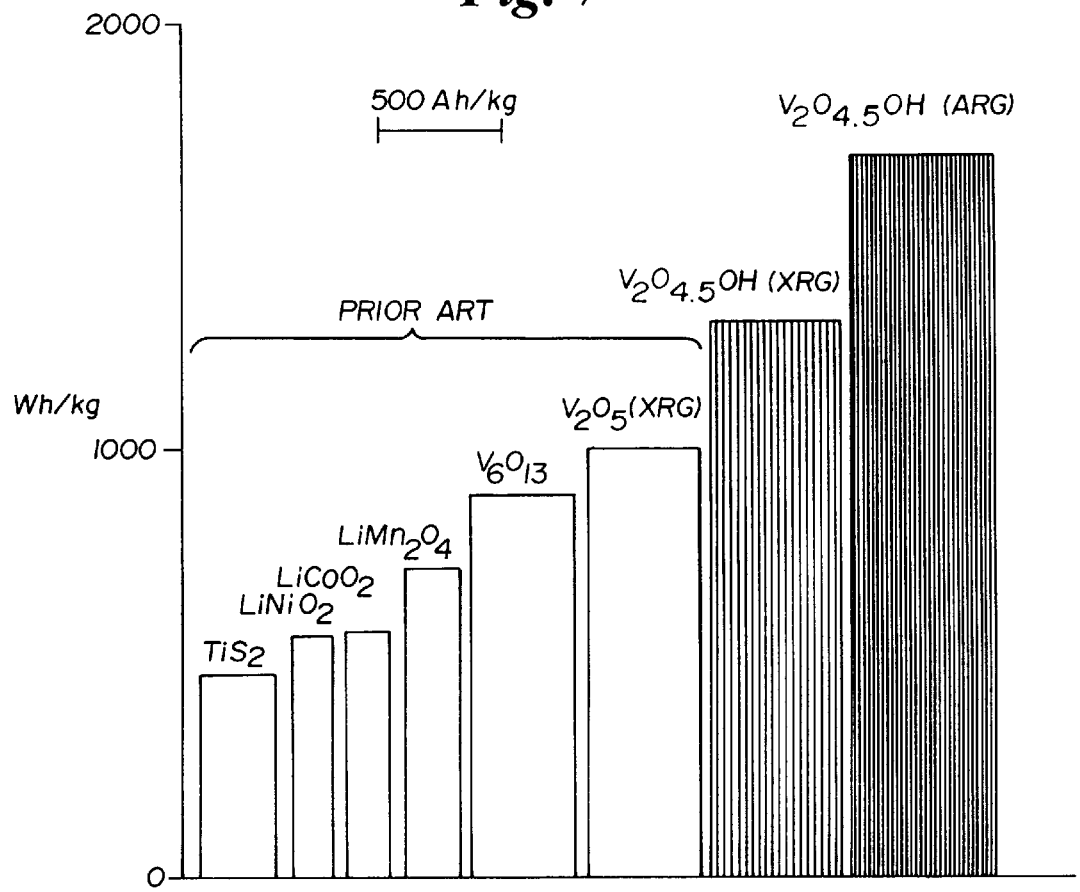
FIG. 7 is a bar graph of specific energy and specific capacity of several intercalation oxides, of the prior art and of the invention.

The significance of the exceptional capacity and specific energy of the material of the invention is indicated by the comparison shown in FIG. 7. The height of the bars shows the specific energy which is nearly twice for the invention as the prior art materials. The latter include V$_2$O$_5$ XRG that in prior art morphologies would only insert 2.4 Li$^+$ ions per V$_2$O$_5$, giving a specific capacity of 350 Ah/kg and a specific energy of only 970T Wh/kg per unit mass of the cathode active material. The width of the bars indicates the specific capacity of the host materials. The two properties suggest that both forms of the invention V$_2$O$_5$ material would be very attractive for use in rechargeable lithium batteries. In fact, such an application represents a preferred use of the materials of the invention and is described further hereinbelow.

It has been shown above that V$_2$O$_{4.5}$(OH) (nominal experimental formula) when prepared according to the invention provides preferred intercalation materials which show a high capacity for electrochemical lithium insertion. These materials can be used in electrochemical devices, including rechargeable lithium and batteries and lithium ion batteries, electrochemical displays and other devices. The invention includes drying xerogel (XRG) films, particles and powders; drying cryogels (CRG) and aerogels (ARG) in those forms and also includes composites with carbon particles and other conductive particles, fibers and sheets.

The materials of the invention show experimental energy densities for lithium insertion of greater than 1000 watt-hours/kilogram of cathode active material and specific capacities greater than 1500 coulomb/gram of the cathode active material, the inventions being completely reversible.

The preparation of the aerogel form is realized by exchanging water in the hydrogel with an organic solvent to make an organogel which is then supercritically dried with $CO_2$. This provides a host product having a surface area of up to 300–450 square meters/gram and reduces the diffusion distance in the host. Both greatly enhance the rate of injection and release of $Li^+$.

Films may be produced ranging from 20 or 30 nanometers up to tens of microns thick or particles that are submicron or above or highly porous films and particles and have surface areas up to 300–450 square meters/gram. Shearing of the precursor hydrogel may typically be accomplished by spinning, agitation, shear coating, doctor blading, roll coating or by spraying. Other methods will ready occur to those familiar with this art.

The more preferred processing involves quick vacuum drying at room temperature (xerogels), freeze drying (cryogels) and supercritical drying (aerogels). The drying conditions influence the final internal structure of the materials causing the self-assembled polymers of the hydrogel to organize preferentially with respect to each other. Highly ordered products have lower capacity for Li insertion and lower specific energy than disordered materials.

Most importantly the materials of the inventions serve as facile hosts for $Li^+$ ions in a completely reversible manner, allowing insertion and release of up to 4 ions of Li per mole of $V_2O_5$.

Batteries

Cathodes made for lithium rechargeable batteries are typically films or powder. The cathodes of choice have been $LiCoO_2$, $V_6O_{13}$ and $LiMn_2O_4$, which have theoretical specific energies of 600 Wh/kg, 890 Wh/kg, and 700 Wh/kg, respectively.

Figure 8:
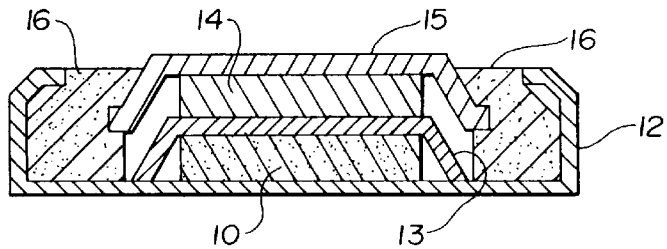
FIG. 8 is a schematic of an exemplary battery making use of the invention.

Vanadium pentoxide xerogels, cryogels and aerogels of the invention offer experimental specific energies on the order of 1000 Wh/kg. The high surface area aerogels obtained via supercritical drying offer an experimental specific energy on the order of 1500 Wh/kg in addition to the high surface area (>300–450 m$^2$/g). Thus, it appears that the materials of the invention where used against a lithium ion producing anode i.e., any lithium ion source anode in an appropriate a battery configuration will provide a superior rechargeable lithium battery, such as that shown in FIG. 8, which is of a circular or round configuration and is shown in cross-section.

Such a battery may for example use any of the hereindescribed material of the invention as a cathode 10 which is placed in a metal containing 12 and covered with a separator 13 made of microporous polypropylene glass cloth or the like saturated with an appropriate electrolyte. Many electrolytes are known in the art for lithium batteries such as 1 M solution of $LiClO_4$ in 50:50 ethylene carbonate and dimethoxyethane or 1 M $LiClO_4$ in propylene carbonate. Thereafter, a lithium ion anode source means 14 was placed on top of separator 13. The anode may be lithium metal or a composite of lithium and carbon as shown in EP 0561372A1 or any other anode capable of producing lithium ions to the battery. Anode 14 is then covered with a metal closing cover 16 which may be stainless steel as may be container 12. The cover 16 and container 12 are provided with an insulating gasket 16 around the periphery of cover 15 between it and the inside of container 12 to close the battery.

This configuration is meant to be taken as an example only since any configuration may be used and many are known for a wide variety of applications.

Such a battery may be provided in a "charged" condition i.e., no lithium yet inserted into the cathode 10 or it may be provided in a "discharged" condition i.e., lithium inserted into the cathode 10, requiring charging before use. Lithium maybe readily inserted electrochemically by polarizing the battery appropriately or inserted chemically as with butyllithium.

There are provided herein unique compositions for high rate materials for electrodes for batteries and unique methods of synthesizing such materials.

The invention described is not intended to be limited to embodiments disclosed but includes modifications made within the true spirit and scope of the invention. The insertion will be of specific use in batteries such as "lithium-ion" or "rocking-chair" batteries and also batteries with Li-ion conducting polymer electrolytes. All of which are included herein, although not exclusively, when the term "battery" is used.

What is claimed is as follows:

1. A process for the preparation of intercalation materials of the nominal compound $V_2O_{4.5}(OH)$, comprising:
    providing an aqueous solution of $V_2O_5$ networks progressively formed as a sol, then a gel to yield a precursor hydrogel and treating the precursor hydrogel to form a xerogel of the nominal compound $V_2O_{4.5}(OH)$ by selecting one of the methods from the group consisting of:
    A. vacuum drying of the precursor to the xerogel $V_2O_{4.5}(OH)$ form to a bulk powder; and
    B. preparing a film xerogel on a substrate utilizing shear.

2. The process of claim 1 wherein the film xerogel form is prepared with shear by means of spin coating, followed by a vacuum drying step.

3. A process for the preparation of intercalation materials of the nominal compound $V_2O_{4.5}(OH)$, comprising:
    providing an aqueous solution of $V_2O_5$ networks progressively formed as a sol, then a gel to yield a precursor hydrogel and treating the precursor hydrogel to form a xerogel of the nominal compound $V_2O_{4.5}(OH)$ by selecting one of the methods from the group consisting of:
    A. vacuum drying of the precursor to the xerogel $V_2O_{4.5}(OH)$ form to a bulk powder; and
    B. preparing a film xerogel on a substrate utilizing shear by means of dip coating, followed by a vacuum drying step.

4. A process for the preparation of intercalation materials of the nominal compound $V_2O_{4.5}(OH)$, comprising:
    providing an aqueous solution of $V_2O_5$ networks progressively formed as a sol, then a gel to yield a precursor hydrogel and treating the precursor hydrogel to form a xerogel of the nominal compound $V_2O_{4.5}(OH)$ by selecting one of the methods from the group consisting of:

A. vacuum drying of the precursor to the xerogel $V_2O_{4.5}(OH)$ form to a bulk powder; and B. preparing a film xerogel on a substrate utilizing shear by spray coating, followed by a vacuum drying step.

5. A process for the preparation of intercalation materials of the nominal compound $V_2O_{4.5}(OH)$, comprising:

providing an aqueous solution of $V_2O_5$ networks progressively formed as a sol, then a gel to yield a precursor hydrogel and treating the precursor hydrogel to form a xerogel of the nominal compound $V_2O_{4.5}(OH)$ by selecting one of the methods from the group consisting of:

A. vacuum drying of the precursor to the xerogel $V_2O_{4.5}(OH)$ form to a bulk powder; and B. preparing a film xerogel on a substrate utilizing shear by doctor blading, followed by a vacuum drying step.

6. A process for the preparation of intercalation materials of the nominal compound $V_2O_{4.5}(OH)$, comprising:

providing an aqueous solution of $V_2O_5$ networks progressively formed as a sol, then a gel to yield a precursor hydrogel and treating the precursor hydrogel to form a xerogel of the nominal compound $V_2O_{4.5}(OH)$ by selecting one of the methods from the group consisting of:

A. vacuum drying of the precursor to the xerogel $V_2O_{4.5}(OH)$ form to a bulk powder; and B. preparing a film xerogel on a substrate utilizing shear; wherein the precursor hydrogel is treated by adding conductive particles to it prior to xerogel formation.

7. The process of claim 6 wherein the particles are a form of carbon.

8. The process of claim 6 wherein the precursor is sonicated following the addition of the conductive particles.

9. The process of claim 8 wherein the sonicated precursor is formed into a coating on a substrate.

10. A new reversibly intercalated nominal compound $Li_xV_2O_{4.5}(OH)$ where $2.4 \leq X \leq 4$, in the form of a xerogel.

11. A composition comprising the compound of claim 10 and conductive particles.

12. The composition of claim 11 wherein the particles are carbon.

13. An electrode including a quantity of nominal compound $V_2O_{4.5}(OH)$ xerogel characterized in that it is capable of intercalating lithium ions to the extent greater than 2.4 and up to 4 $Li^+$ ions per unit of $V_2O_5$.

14. The electrode of claim 13 wherein the xerogel is in the form of a coating.

15. The electrode of claim 13 wherein the xerogel is in the form of a powder mixed with other constituents.

16. The electrode of claim 15 wherein one of the other constituents is a quantity of conductive particles.

17. The electrode of claim 16 wherein the particles are a form of carbon.

18. The electrode of claim 15 wherein one of the other constituents is a binder.

19. The electrode of claim 13 further comprising a metal bronze.

20. A battery comprising a lithium ion source anode and an opposing cathode comprising a material capable of reversibly intercalating lithium ions characterized in that the cathode material is a nominal compound $V_2O_{4.5}(OH)$ xerogel having the capacity for reversibly intercalating at least 2.4 to 4 lithium ions per mole of $V_2O_5$ in the cathode material.

21. A battery comprising a lithium ion source anode means and an opposing cathode comprising a material capable of reversibly intercalating lithium ions characterized in that the cathode material is a nominal compound $V_2O_{4.5}(OH)$ xerogel including bound carbon.

22. The battery of claim 21 wherein the xerogel has a surface area in excess of about 300–450 $m^2/g$.

23. A battery comprising a lithium ion source anode means and an opposing cathode comprising a material capable of reversibly intercalating lithium ions characterized in that the material is a nominal compound $V_2O_{4.5}(OH)$ xerogel and provides a half cell reaction of x $Li^+ + V_2O_{4.5}(OH) + x\bar{e} \leftrightarrows Li_xV_2O_{4.5}(OH)$ where $2.4 \leq X \leq 4$.

* * * * *

UNITED STATES PATENT AND TRADEMARK OFFICE
CERTIFICATE OF CORRECTION

PATENT NO. : 6,013,391

DATED : January 11, 2000

INVENTOR(S) : Dinh Ba Le et al

It is certified that error appears in the above-identified patent and that said Letters Patent is hereby corrected as shown below:

Col. 1, line 12, delete "N/N0014-92-J-L875" and insert -- N/N0014-92-J-1875 --.

Signed and Sealed this

Fifteenth Day of May, 2001

*Attest:*

NICHOLAS P. GODICI

*Attesting Officer*    *Acting Director of the United States Patent and Trademark Office*